US011448108B1

(12) United States Patent
Dudar

(10) Patent No.: US 11,448,108 B1
(45) Date of Patent: Sep. 20, 2022

(54) SYSTEM AND METHODS FOR MITIGATING HYDROCARBON BREAKTHROUGH

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/449,939

(22) Filed: Oct. 4, 2021

(51) Int. Cl.
| | | |
|---|---|---|
| *F01N 3/05* | (2006.01) |
| *F01N 1/00* | (2006.01) |
| *F02M 35/10* | (2006.01) |
| *F02D 41/00* | (2006.01) |
| *F02B 37/18* | (2006.01) |
| *F02M 26/08* | (2016.01) |
| *F02B 39/10* | (2006.01) |
| *F01N 11/00* | (2006.01) |
| *F02N 11/08* | (2006.01) |

(52) U.S. Cl.
CPC .............. *F01N 3/05* (2013.01); *F01N 11/002* (2013.01); *F02B 37/183* (2013.01); *F02B 39/10* (2013.01); *F02D 41/0032* (2013.01); *F02M 26/08* (2016.02); *F02M 35/10157* (2013.01); *F02N 11/0814* (2013.01)

(58) Field of Classification Search
CPC . F01N 3/02; F01N 3/05; F01N 3/2006; F01N 11/002; F01N 2270/02; F01N 2260/022; F02B 37/183; F02B 39/10; F02D 41/0032; F02M 26/08; F02M 35/10157; F02N 11/0814; Y02T 10/12; Y02T 10/40
See application file for complete search history.

(56) References Cited

U.S. PATENT DOCUMENTS

| | | | |
|---|---|---|---|
| 6,021,640 A | 2/2000 | Hirota et al. | |
| 6,951,099 B2 * | 10/2005 | Dickau | F01N 3/2046 60/275 |
| 9,850,832 B2 | 12/2017 | Dudar | |
| 10,265,657 B2 * | 4/2019 | Rhodes | B01D 53/9454 |
| 2016/0319718 A1 * | 11/2016 | Dudar | F02M 25/089 |

FOREIGN PATENT DOCUMENTS

| | | |
|---|---|---|
| DE | 102010027220 A1 | 1/2012 |
| KR | 20020083930 A | 11/2002 |

OTHER PUBLICATIONS

Martz, J. et al., "Methods and Systems for Engine Exhaust Catalyst Operations," U.S. Appl. No. 17/444,471, filed Aug. 4, 2021, 42 pages.

* cited by examiner

*Primary Examiner* — Audrey B. Walter
*Assistant Examiner* — Dapinder Singh
(74) *Attorney, Agent, or Firm* — Vincent Mastrogiacomo; McCoy Russell LLP

(57) ABSTRACT

Methods and systems are provided for mitigating hydrocarbon breakthrough from an onboard fuel vapor canister during an engine-off condition. In one example, a method may include actively routing ambient air to an exhaust catalyst to reducing a temperature of the exhaust catalyst.

19 Claims, 4 Drawing Sheets

SYSTEM AND METHODS FOR MITIGATING HYDROCARBON BREAKTHROUGH

FIELD

The present description relates generally to methods and systems for mitigating hydrocarbon breakthrough from an onboard fuel vapor canister.

BACKGROUND/SUMMARY

Vehicle emission control systems may be configured to store refueling vapors, running-loss vapors, and diurnal emissions in a fuel vapor canister, and then purge the stored vapors during a subsequent engine operation. The stored vapors may be routed to engine intake for combustion, further improving fuel economy for the vehicle. In a typical canister purge operation, a canister purge valve coupled between the engine intake and the fuel vapor canister is opened, allowing for intake manifold vacuum to be applied to the fuel vapor canister. Fresh air may be drawn through the fuel vapor canister via an open canister vent valve. This configuration facilitates desorption of stored fuel vapors from the adsorbent material in the canister, regenerating the adsorbent material for further fuel vapor adsorption.

However, engine run time in vehicles may be interrupted such as during prolonged engine idle-stops during heavy traffic conditions, and thus opportunities for purging fuel vapor from the canister may also be limited. If the vehicle is refueled, saturating the canister with fuel vapor, and then idle-stopped in a hot, sunny location prior to a purge event, the canister may desorb fuel vapors as it warms up, leading to breakthrough of hydrocarbons (HCs) from the fuel vapor canister. For vehicles that vent the fuel tank during an engine-off condition, the valorization of fuel under similar conditions may overwhelm the capacity of the fuel vapor canister.

One approach for addressing a potential HC breakthrough is described by Robichaux and Kotre in US Patent No. 20020083930 A1. Therein, a method for purging the fuel vapor canister is provided for a hybrid electric vehicle (HEV) comprising commanding the engine to come on during vehicle idle conditions so that the purging process may be executed. By controlling throttle position, sufficient intake manifold vacuum may be provided such that fuel vapor may be rapidly drawn into the engine intake.

However, the inventors herein have recognized potential issues with such systems. As one example, turning on the internal combustion engine solely to perform a purge operation may reduce the operating efficiency of the HEV as a result of additional fuel being consumed in order to start the engine. Furthermore, such an approach may not be practical if exhaust heat is relied upon for providing the heat source to increase the temperature of the exhaust catalyst. Due to geometry of the fuel vapor canister, air flow through all parts of the canister may not be uniform. Therefore, all parts of the canister may not be purged completely during each purging event, and HCs may be retained in those parts of the canister. Such un-purged HCs may be bled out of the canister if the vehicle is exposed to high temperatures for a prolonged duration. Such HCs may then migrate along the vent line which is proximal to the exhaust passage. The exhaust passage, in particular the exhaust catalyst, may be at an elevated temperature, and the presence of HCs at the elevated temperature may not be desirable, due to possibility of increased emissions and coking.

In one example, the issues described above may be addressed by a method for an engine in a vehicle, comprising: during an engine-off condition, actively reducing a temperature of an exhaust catalyst by routing ambient air to the exhaust system. In this way, by actively reducing the temperature of the exhaust catalyst during a HC breakthrough, possibility of coking in the engine and increased emissions may be reduced.

As one example, a HC sensor may be coupled to the vent line of the evaporative emission control (EVAP) system to detect a breakthrough of HCs from the fuel vapor canister. If the breakthrough occurs during a temporary engine-off condition such as during an idle-stop condition, when the exhaust catalyst temperature is above a first threshold temperature, the catalyst may be actively cooled. In order to cool the catalyst, the engine may be rotated unfueled to rout cold air to the catalyst. Additionally or alternatively, an electric booster coupled to the intake manifold may be may be operated to compress intake air which may then be routed directly to the exhaust catalyst via an exhaust gas recirculation (EGR) passage. The fresh air routed to the exhaust catalyst may cool the exhaust catalyst. Also, a cooling system for an on-board turbocharger may be activated to cool the exhaust turbine and the exhaust passage. Cooling of the exhaust catalyst and the exhaust passage may be suspended upon the catalyst temperature reducing to a second threshold temperature, the second threshold temperature lower than the first threshold temperature and higher than the catalyst's light-off temperature.

In this way, by actively cooling the hottest part of the exhaust system in response to a HC breakthrough, adverse effects of HC breakthrough may be mitigated. By cooling the exhaust passage, possibility of coking and mechanical wear of the exhaust system may be reduced. The technical effect of operating the engine unfueled and/or the e-booster is that fresh air may be directly routed to the exhaust catalyst to lower the catalyst temperature without initiating combustion in the engine cylinders. Overall, by effectively mitigating the adverse effects of a HC breakthrough, desired emissions quality and robustness of the exhaust system may be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
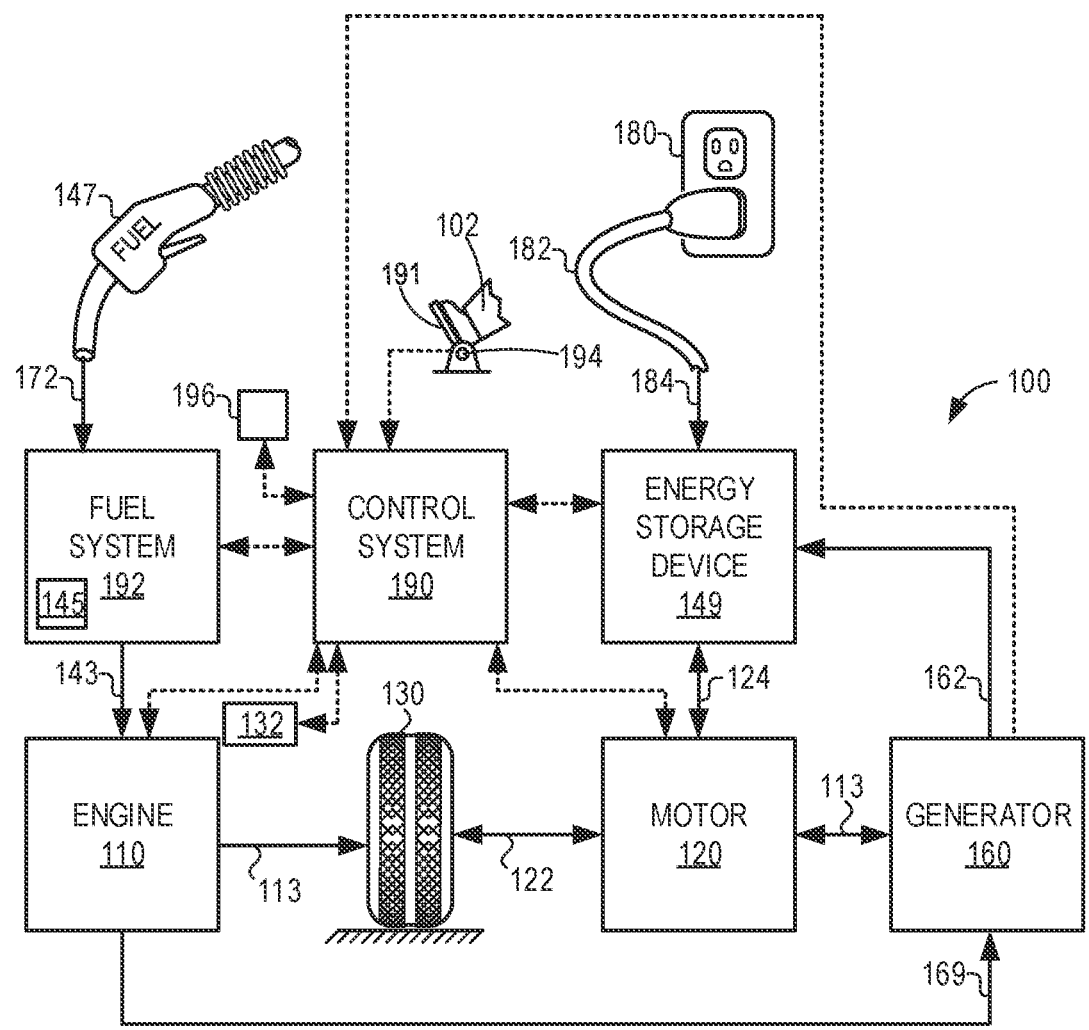
FIG. 1 schematically shows an example vehicle propulsion system.

The following description relates to systems and methods for mitigating hydrocarbon breakthrough from a fuel vapor canister of an evaporative emissions control (EVAP) system in a vehicle, such as hybrid vehicle of FIG. 1. The EVAP system is elaborated in FIG. 2. An engine controller may be configured to perform a control routine, such as the example routine of FIG. 3 to reduce the temperature of the exhaust system during an engine-off condition responsive to a HC breakthrough. An example operating sequence for cooling of the exhaust system responsive to the HC breakthrough is shown in FIG. 4.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 149. For example, motor 120 may receive wheel torque from drive wheel 130 as indicated by arrow 122 where the motor may convert the kinetic energy of the vehicle to electrical energy for storage at energy storage device 149 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 149 as indicated by arrow 162.

During still other operating conditions, engine 110 may be operated by combusting fuel received from fuel system 192 as indicated by arrow 143. For example, engine 110 may be operated to propel the vehicle via drive wheel 130 as indicated by arrow 113 while motor 120 is deactivated. During other operating conditions, both engine 110 and motor 120 may each be operated to propel the vehicle via drive wheel 130 as indicated by arrows 113 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 169, which may in turn supply electrical energy to one or more of motor 120 as indicated by arrow 113 or energy storage device 149 as indicated by arrow 162.

As another example, engine 110 may be operated to drive motor 120 which may in turn provide a generator function to convert the engine output to electrical energy, where the electrical energy may be stored at energy storage device 149 for later use by the motor.

In still other examples, which will be discussed in detail below, motor 120 may in some examples be utilized to spin or rotate the motor in an unfueled configuration. More specifically, motor 120 may rotate the engine unfueled, using power from onboard energy storage device 149, which may include a battery, for example. In a case where motor 120 is used to rotate the engine unfueled, fuel injection to engine cylinders may be prevented, and spark may not be provided to each of the engine cylinders.

Fuel system 192 may include one or more fuel storage tanks 145 for storing fuel on-board the vehicle. For example, fuel tank 145 may store one or more liquid fuels, including but not limited to: gasoline, diesel, and alcohol fuels. In some examples, the fuel may be stored on-board the vehicle as a blend of two or more different fuels. For example, fuel tank 145 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 143. Still other suitable fuels or fuel blends may be supplied to engine 110, where they may be combusted at the engine to produce an engine output. The engine output may be utilized to propel the vehicle as indicated by arrow 113 or to recharge energy storage device 149 via motor 120 or generator 160.

In some examples, energy storage device 149 may be configured to store electrical energy that may be supplied to other electrical loads residing on-board the vehicle (other than the motor), including operating an electric booster (e.g., electric supercharger), cabin heating and air conditioning, engine starting, headlights, cabin audio and video systems, etc. As a non-limiting example, energy storage device 149 may include one or more batteries and/or capacitors.

Control system 190 may communicate with one or more of engine 110, motor 120, fuel system 192, energy storage device 149, and generator 160. Control system 190 may receive sensory feedback information from one or more of engine 110, motor 120, fuel system 192, energy storage device 149, and generator 160. Further, control system 190 may send control signals to one or more of engine 110, motor 120, fuel system 192, energy storage device 149, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 191. Pedal 191 may refer schematically to a brake pedal and/or an accelerator pedal Energy storage device 149 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 149 from power source 180 via an electrical energy transmission cable 182. During a recharging operation of energy storage device 149 from power source 180, electrical transmission cable 182 may electrically couple energy storage device 149 and power source 180. While the vehicle propulsion system is operated to propel the vehicle, electrical transmission cable 182 may be disconnected between power source 180 and energy storage device 149. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 149 from power source 180. For example, energy storage device 149 may receive electrical energy from power source 180 via one or more of electromagnetic induction, radio waves, and electromagnetic resonance. As such, it should be appreciated that any suitable approach may be used for recharging energy storage device 149 from a power source that does not comprise part of the vehicle. In this way, motor 120 may propel the vehicle by utilizing an energy source other than the fuel utilized by engine 110.

Fuel system 192 may periodically receive fuel from a fuel source residing external to the vehicle. As a non-limiting example, vehicle propulsion system 100 may be refueled by receiving fuel via a fuel dispensing device 147 as indicated by arrow 172. In some examples, fuel tank 145 may be configured to store the fuel received from fuel dispensing device 147 until it is supplied to engine 110 for combustion. In some examples, control system 190 may receive an indication of the level of fuel stored at fuel tank 145 via a fuel level sensor. The level of fuel stored at fuel tank 145 (e.g., as identified by the fuel level sensor) may be communicated to the vehicle operator, for example, via a fuel gauge or indication in a vehicle instrument panel 196.

The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters and ambient conditions such as local barometric pressure and humidity. As discussed above, control system 190 may further be configured to receive information via the internet or other communication networks. Information received from the GPS may be cross-referenced to information available via the internet to determine local weather conditions, local vehicle regulations, etc.

Figure 2:
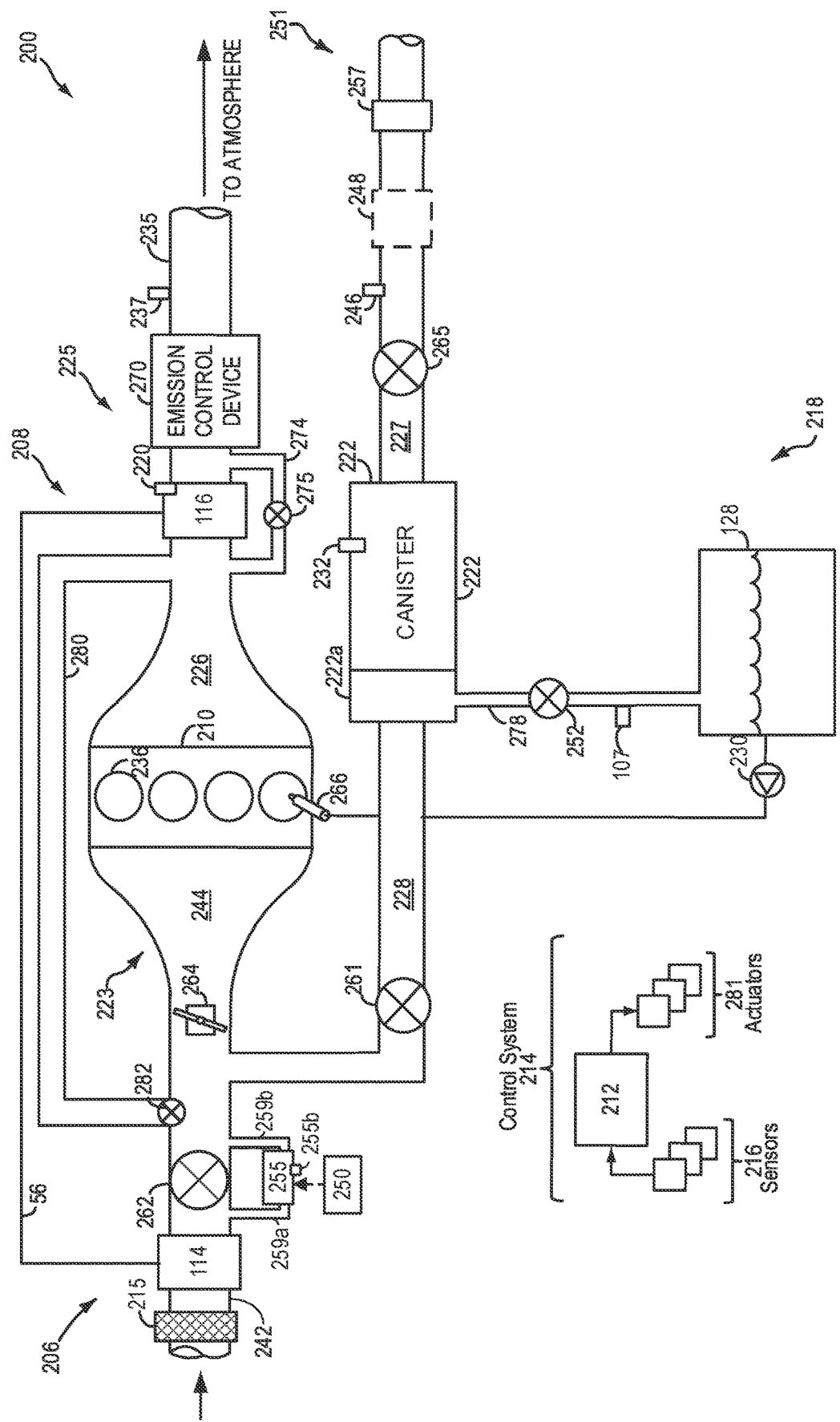
FIG. 2 shows an example engine system including an electric booster and an evaporative emissions control (EVAP) system.

FIG. 2 shows a schematic depiction 200 of a vehicle system 206. It may be understood that vehicle system 206 may comprise the same vehicle system as vehicle propulsion system 100 depicted at FIG. 1. The vehicle system 206 includes an engine system 208 coupled to an emissions control (EVAP) system 251 and a fuel system 218. It may be understood that fuel system 218 may comprise the same fuel system as fuel system 140 depicted at FIG. 1. EVAP system 251 includes a fuel vapor container or canister 222 which may be used to capture and store fuel vapors.

The engine system 208 may include an engine 210 having a plurality of cylinders 236. While not explicitly shown, it may be understood that each cylinder may include one or more intake valve(s) and one or more exhaust valve(s). The engine 210 includes an engine air intake 223 and an engine exhaust system 225. The engine air intake 223 includes a throttle 264 in fluidic communication with engine intake manifold 244 via an intake passage 242. The throttle 264 may comprise an electronic throttle, which may be controlled via the vehicle controller sending a signal to actuate the throttle to a desired position. In such an example where the throttle is electronic, power to control the throttle to the desired position may be from an onboard energy storage device (e.g., 150), such as a battery. Further, engine air intake 223 may include an air box and intake air filter 215 positioned upstream of throttle 264.

In the depicted embodiment, engine 210 is a boosted engine coupled to a turbocharger including a compressor 114 driven by a turbine 116. Specifically, fresh air is introduced along intake passage 242 into engine 210 via intake air filter 215 and flows to compressor 114. The compressor may be any suitable intake-air compressor, such as a motor-driven or driveshaft driven supercharger compressor. In engine system 210, the compressor is a turbocharger compressor mechanically coupled to turbine 116 via a shaft 56, the turbine 116 driven by expanding engine exhaust. A wastegate passage 274 housing a wastegate valve 275 may be coupled across the turbine to enable at least a portion of exhaust gas to bypass the turbine 116 during lower boost demand conditions. Compressor 114 may be coupled through charge-air cooler (not shown) to throttle 264. From the compressor, the compressed air charge flows through a charge-air cooler and the throttle 264 to the intake manifold 244.

The turbine 116 may include a cooling system 220 to reduce the temperature of the mechanical components of the turbine 116 as hot exhaust gas flows through it. The cooling system 220 may include a coolant pump for circulating coolant through the turbine 116 and/or a cooling fan.

To assist the turbocharger, an additional intake air compressor, herein also referred to as an electric booster (e-booster) 255 may be incorporated into the vehicle propulsion system. Electric booster 255 may be powered via an onboard energy storage device 250, which may comprise a battery, capacitor, supercapacitor, etc. In one example, the energy storage device 250 may be the energy storage device 149 in FIG. 1. The electric booster may include a compressor driven by an electric motor. The e-booster 255 may also include a dedicated coolant pump and/or fan to cool down the e-booster during operation. A speed of operation of the electric booster may include adjusting a speed of operation of the electric motor, the electric motor operated via the on-board energy storage device 250.

In one example, electric booster 255 may be actuated in response to a demand for increased wheel torque, in order to provide the desired boost air rapidly to the engine while the turbocharger turbine spools up. As a result, the increased torque can be met without incurring turbo lag, which may otherwise have occurred if the assist from the electric booster was not available. In such an example, responsive to the turbocharger spooling up to a threshold speed (e.g. 70,000 rpm), the electric booster 255 may be actuated off, or deactivated. More specifically, operational control of the electric booster 255 may be achieved based on command signals (e.g. duty cycle or pulse width signals) received from a vehicle controller (e.g. controller 212). For example, the controller may send a signal to an electric booster actuator 255*b*, which may actuate on the electric booster 255. In one example, the electric booster actuator 255*b* may comprise an electric motor which drives the compression of air.

Electric booster 255 may be positioned between a first electric booster conduit 259*a*, and a second electric booster conduit 259*b*. First electric booster conduit 259*a* may fluidically couple intake passage 242 to electric booster 255 upstream of electric booster bypass valve 262. Second electric booster conduit 259b may fluidically couple electric booster 255 to intake passage 242 downstream of electric booster bypass valve 262. As an example, air may be drawn into electric booster 255 via first electric booster conduit 259a upstream of electric booster bypass valve 262, and compressed air may exit electric booster 255 and be routed via second electric booster conduit 259b to intake passage 242 downstream of electric booster bypass valve 262. In this way, compressed air may be routed to engine air intake 223.

In circumstances where the electric booster 255 is activated to provide boost more rapidly than if the turbocharger were solely relied upon, it may be understood that electric booster bypass valve 262 may be commanded closed while electric booster 255 is activated. In this way, intake air may flow through turbocharger and through electric booster 255. Once the turbocharger reaches the threshold speed, the electric booster 255 may be turned off, and the electric booster bypass valve 262 may be commanded open. In an alternate embodiment, an electric turbine may be coupled to the exhaust passage upstream of the turbine 116 which when operated may increase boost pressure in a way similar to the electric booster 255.

Exhaust gas recirculation (EGR) delivery passage 280 may be coupled to an exhaust passage 235 upstream of turbine 116 to provide high pressure EGR (HP-EGR) to the engine intake manifold, downstream of each of the compressor 114 and the e-booster 255. An EGR valve 282 may be coupled to the HP-EGR passage at the junction of the HP-EGR passage 280 and the intake passage 242. HP-EGR valve 282 may be opened to admit a controlled amount of exhaust to the compressor outlet for desirable combustion and emissions control performance. HP-EGR valve 282 may be configured as a continuously variable valve or as an on/off valve.

In further embodiments, the engine system may include a low pressure EGR (LP-EGR) passage in addition to or in place of the HP-EGR system wherein exhaust gas is drawn from downstream of turbine 116 and recirculated to the engine intake passage 242, upstream of compressor 114.

The engine exhaust system 225 includes an exhaust manifold 226 leading to the exhaust passage 235 that routes exhaust gas to the atmosphere. An exhaust temperature sensor 237 may be coupled to the exhaust passage 235 upstream or downstream of an emissions control device 270. An exhaust gas oxygen sensor (not shown) may also be couple to the exhaust passage 235. The engine exhaust system 225 may include one or more emissions control devices 270, which may be mounted in a close-coupled position in the exhaust. One or more emission control devices may include a three-way catalyst, lean NOx trap, oxidation catalyst, selective reduction catalyst, etc. In addition, a particulate matter filter may be positioned downstream of the emissions control device 270. The emissions control device 270 may be optimally operational above a threshold temperature, also referred as the light-off temperature.

Fuel system 218 may include a fuel tank coupled to a fuel pump system 230. It may be understood that fuel tank 128 may comprise the same fuel tank as fuel tank 144 depicted above at FIG. 1. The fuel pump 230 may include one or more pumps for pressurizing fuel delivered to the injectors of engine 210, such as the example fuel injector 266 shown. While a single fuel injector 266 is shown, additional injectors are provided for each cylinder. It will be appreciated that fuel system 219 may be a return-less fuel system, a return fuel system, or various other types of fuel system.

Vapors generated in fuel system 219 may be routed to an EVAP system 251 which includes the fuel vapor canister 222 via vapor recovery line 278, before being purged to the engine air intake 223. Vapor recovery line 278 may be coupled to fuel tank via one or more conduits and may include one or more valves such as the fuel tank isolation valve (FTIV) 252 for isolating the fuel tank during certain conditions.

EVAP system 251 may include one or more emissions control devices, such as one or more fuel vapor canisters 222 filled with an appropriate adsorbent, the canister is configured to temporarily trap fuel vapors (including vaporized hydrocarbons) during fuel tank refilling operations and "running loss" (that is, fuel vaporized during vehicle operation). In one example, the adsorbent used is activated charcoal. EVAP system 251 may further include a canister ventilation path or vent line 227 which may route gases out of the fuel vapor canister 222 to the atmosphere when storing, or trapping, fuel vapors from fuel system 219.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more canister temperature sensors 232 may be coupled to and/or within canister 222.

Vent line 227 may also allow fresh air to be drawn into canister 222 when purging stored fuel vapors from fuel system 219 to engine air intake 223 via purge line 228 and purge valve 261. The purge valve 261 may be normally closed but may be opened during certain conditions so that vacuum from engine intake manifold 244 is provided to the fuel vapor canister for purging. In some examples, vent line 227 may include an air filter 257 disposed therein upstream of the canister 222.

In some examples, the flow of air and vapors between canister 222 and the atmosphere may be regulated by a canister vent valve 265 coupled within vent line 227. When included, the canister vent valve 265 may be a normally open valve, so that fuel tank isolation valve 252 (FTIV) may control venting of fuel tank with the atmosphere. FTIV 252 may be a normally closed valve, that when opened, allows for the venting of fuel vapors from fuel tank to fuel vapor canister 222. Fuel vapors may then be vented to atmosphere, or purged to engine air intake 223 via canister purge valve 261.

A bleed canister 248 may be housed in the vent line 227 upstream of the fuel vapor canister 222 between the air filter 257 and the fuel vapor canister 222. The bleed canister 248 may include a dense honeycomb structure configured to capture and trap any hydrocarbons that migrate from the main fuel vapor canister 222 (that would otherwise escape to the atmosphere). During conditions such as when a vehicle with loaded fuel vapor canister 222 is parked in a hot weather for a prolonged duration, due to diurnal temperature cycle, some of the HCs stored in the canister 222 may be desorbed and may flow downstream via the vent line 227. Such HCs that bleed out of the canister 222 may be captured at the bleed canister 248 to avert the release of the HCs to atmosphere. The bleed canister 248 may be fluidly coupled to the purge line 228 such that during subsequent engine operation, the HCs trapped by the bleed canister 248 may be purged to the engine intake manifold 224. A HC sensor 246 may be coupled to the vent line between the canister 222 and the bleed canister 248 to detect any bleeding of HCs from the canister 222.

Fuel system 219 may be operated by controller 212 of control system 214 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open FTIV 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation FTIV 252, while maintaining canister purge valve 261 closed, to depressurize the fuel tank before allowing fuel to be added therein. As such, FTIV 252 may be kept open during the refueling operation to allow refueling vapors to be stored in the canister. After refueling is finished, the FTIV 252 may be closed.

As yet another example, the fuel system may be operated in a canister purging mode (e.g., after an emission control device light-off temperature has been attained and with the engine combusting air and fuel), wherein the controller 212 may open canister purge valve 261 while closing FTIV 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Even as the canister 222 may be regularly purged, due to non-uniform geometry of the canister 222, air flow through the canister may be non-uniform, causing HCs to be stuck in certain areas of the canister 222. During prolonged exposure to elevated temperature when the vehicle engine is not operational such as during an engine idle-stop in a heavy traffic condition, HCs from the canister 222 may bleed to the vent line 227. Such breakthrough HCs may migrate along the vent line 227 which is proximal to the exhaust passage 235. The exhaust passage 235, in particular the emissions control device 270, may be at an elevated temperature (such as above 700° F.), and the presence of HCs at the elevated temperature may not be desirable due to possibility of increased emissions and coking.

In response to a temperature of the emissions control device 270 being higher than a first threshold temperature (higher than a light-off temperature of the emissions control device 270) during an engine-off condition and upon detection of HC breakthrough via the HC sensor, ambient air may be routed to the emissions control device 270. The routing of ambient air may be accomplished by rotating the engine un-fueled via an electric motor. During rotation of the engine, a wastegate valve 275 housed in a wastegate passage 274 across an exhaust turbine 116 may be opened to route ambient air from engine cylinders to the emissions control device 270 bypassing the exhaust turbine 116. The routing ambient air may also be by operating e-booster 255 coupled to the intake passage of the engine. During operation of the e-booster, each of the EGR valve 282 coupled to a high pressure EGR line 280 and the wastegate valve 275 may be opened to route ambient air from the e-booster 255 to the emissions control device 270 bypassing the engine cylinders and the exhaust turbine 116. During the routing the ambient air to the exhaust system, a coolant pump and/or a cooling fan of the cooling system 220 coupled to the exhaust turbine may be operated to cool the exhaust system. The routing of ambient air to the exhaust system is continued until the temperature of the emissions control device 270 reduces to below the first threshold temperature, the temperature of the emissions control device 270 staying above the light-off temperature. A detailed method for reduction of temperature of the exhaust system 225 is elaborate din FIG. 3.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust temperature sensor 237, manifold absolute pressure (MAP) sensor, mass air flow (MAF) sensor, HC sensor 246, and canister temperature sensor 232. Other sensors such as pressure, temperature, air/fuel ratio, and composition sensors may be coupled to various locations in the vehicle system 206. As another example, the actuators may include throttle 264, fuel tank isolation valve 252, canister purge valve 261, and canister vent valve 265, e-booster bypass valve 262, wastegate valve 275, and EGR valve 282. The controller may receive input data from the various sensors, process the input data, and trigger the actuators in response to the processed input data based on instruction or code programmed therein corresponding to one or more routines. In one example, during a HC breakthrough, as detected based on input form the HC sensor 246, the controller may activate the electric booster 255 to flow fresh air to the emissions control device 270 to actively cool the exhaust system 225.

In this way, the components described in FIGS. 1-2 enable a system for an engine in a vehicle, comprising: a controller storing instructions in non-transitory memory that, when executed, cause the controller to: upon conditions being met for hydrocarbon breakthrough mitigation, operate an electric motor coupled to an intake manifold of the engine, open an exhaust gas recirculation (EGR) valve regulating flow through a high pressure EGR line, open a wastegate valve housed in a wastegate passage across an exhaust turbine, and route compressed ambient air to an exhaust catalyst coupled to an exhaust passage via the high pressure EGR line and the wastegate passage. The conditions for hydrocarbon breakthrough mitigation may include detection of a hydrocarbon breakthrough from a fuel vapor canister of an on-board evaporative emissions control (EVAP) system during an engine idle-stop condition with a higher than threshold temperature of the exhaust catalyst.

Figure 3:
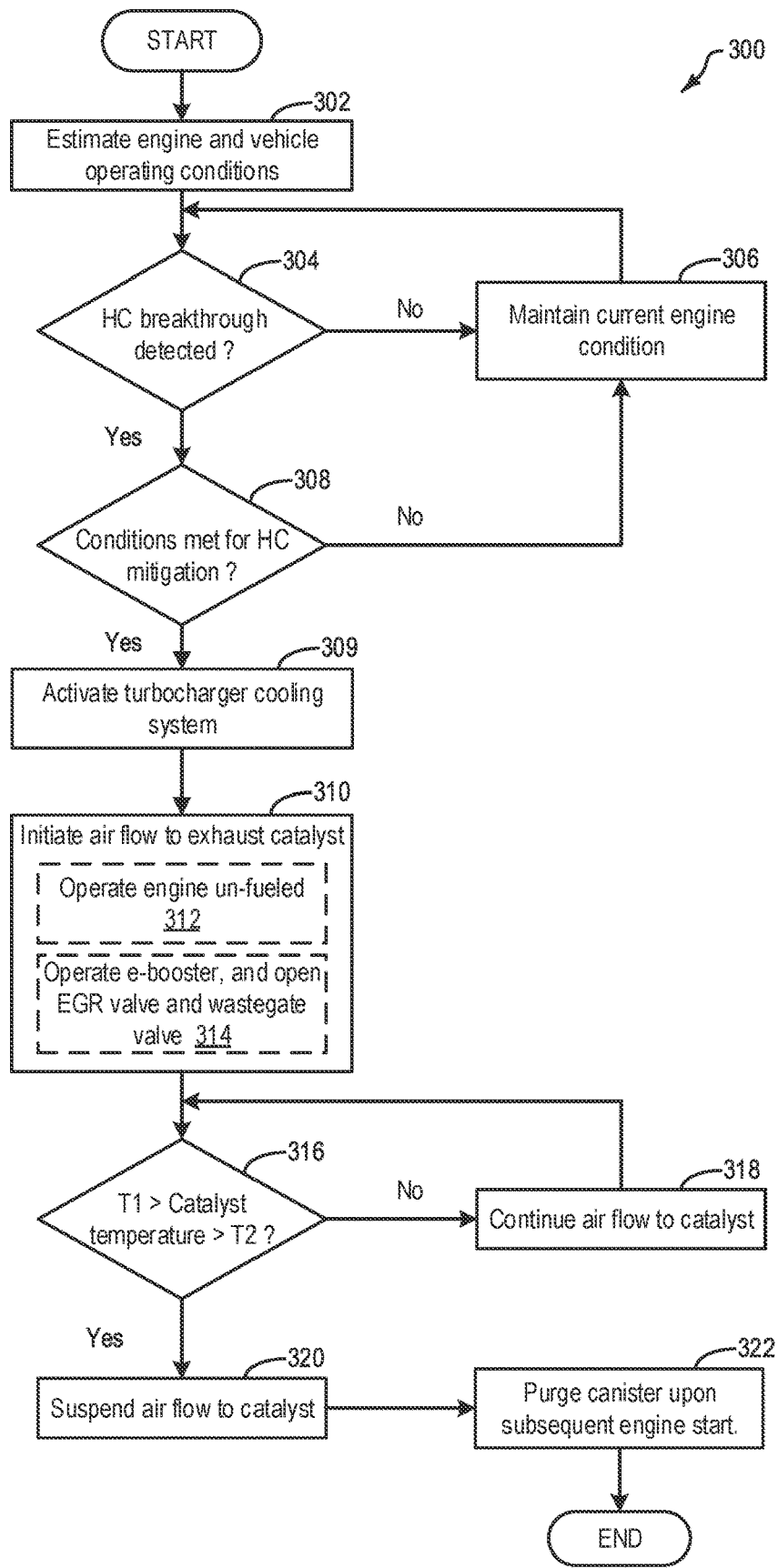
FIG. 3 shows a flowchart for an example method for reducing exhaust temperature during a HC breakthrough.
Figure 4:
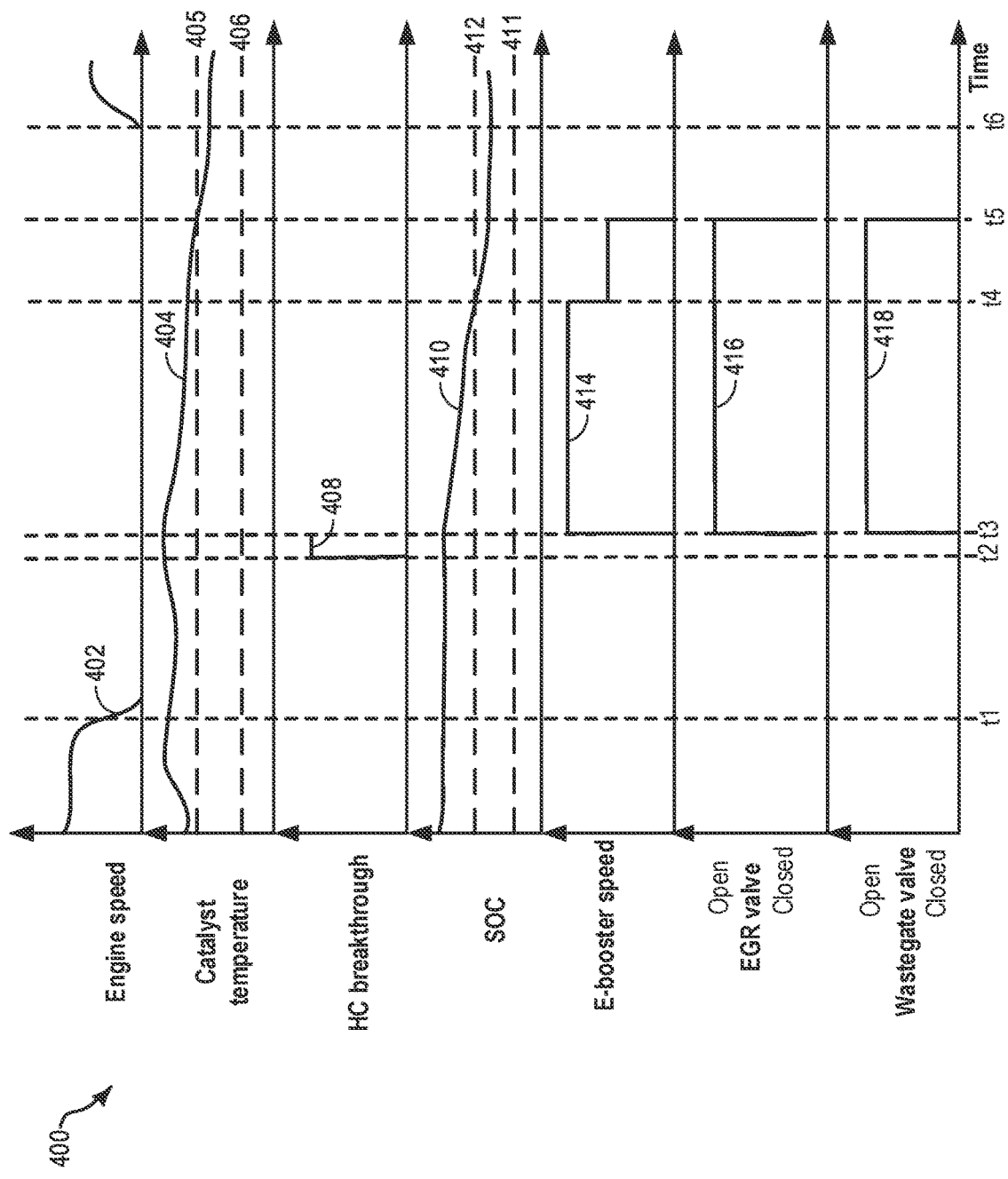
FIG. 4 shows an example of cooling the exhaust system responsive to HC breakthrough.

FIG. 3 shows an example method 300 for mitigation of HC breakthrough from a fuel vapor canister (such as canister 222 in FIG. 2) in an EVAP system (such as EVAP system 251 in FIG. 3A). Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, method 300 includes estimating and/or measuring vehicle operating conditions of the vehicle. Vehicle operating conditions may be estimated based on one or more outputs of various sensors of the vehicle (e.g., such as oil temperature sensors, engine velocity or wheel velocity sensors, torque sensors, etc., as described above in reference to vehicle propulsion system 100 of FIG. 1). Vehicle operating conditions may include engine velocity and load, vehicle velocity, exhaust gas flow rate, mass air flow rate, coolant temperature, exhaust temperature, charge, engine torque output, vehicle wheel torque, etc. Further, a state of loading of a fuel vapor canister (such as canister 222 in FIG. 2) may be estimated. The state of loading may be estimated based on one or more of an output of an exhaust gas oxygen sensor, a purge schedule of the canister, and a duration of opening of the FTIV (such as FTIV 252 in FIG. 2) following a purge.

At 304, the routine includes determining if a HC breakthrough has been detected from the canister. The HC breakthrough may be detected based on output of a HC sensor (such as HC sensor 246 in FIG. 2) coupled to a vent line (such as vent line 227 in FIG. 2). If HCs bleed out of the canister such as during a hot weather condition, the HCs may flow downstream via the vent line and get detected at the HC sensor. If the EVAP system includes a bleed canister (such as bleed canister 248 in FIG. 2), at least a portion of the breakthrough HCs may be adsorbed at the bleed canister.

If any breakthrough HCs are not detected, it may be inferred that the canister is able to retain all the adsorbed HCs. At 306, current engine condition may be maintained. As an example, the e-booster may be operated to provide increased boost and combustion of fuel and air may be carried out in the engine cylinders.

If breakthrough HCs are detected, at 308, the routine includes determining if conditions are met for HC breakthrough mitigation. In one example, if the HC breakthrough occurs during vehicle motion, the HCs may not deposit at low pressure regions proximal to the exhaust passage. The air flow through the engine components during vehicle motion causes the HCs to migrate downstream via the vent line and get adsorbed at the bleed canister and/or diffuse to the atmosphere. Since the HCs are not deposited in the hot components of the engine such as proximal to the exhaust system, active mitigation of the HC breakthrough may not be desired. However, if the HC breakthrough occurs during an engine-off condition, such as during an engine idle-stop, due to lack of air flow through the engine and EVAP system, the breakthrough HCs may get deposited on the hot components of the engine which may cause coking and further reduction in emissions quality.

An engine idle-stop may occur in response to the engine idling for a longer than threshold duration. For example, engine idling may take place while the vehicle is at a traffic stop when the engine load is below a threshold (such as when the vehicle is stationary). Engine operation at the idling speed for a longer than threshold duration may result in increased fuel usage and increased level of exhaust emissions. Also, the threshold duration may be based on fuel level in the fuel tank. In one example, if the fuel level in the fuel tank is lower than a threshold level, the threshold duration may be decreased such that additional fuel may not be consumed for engine idling. The driver requested torque may be estimated and confirmation of an engine idle-stop may be initiated in response to a lower than threshold driver requested torque. The vehicle speed may be estimated and assessed whether it is below a predetermined threshold. For example, if the vehicle speed is lower than a threshold (e.g., 3 mph) an engine ide-stop may be requested even if the vehicle is not at rest. During an engine idle-stop, the temperature of the exhaust system including the emissions control device may be elevated (such as above 700° F.).

In another example, HC breakthrough mitigation may be carried out when the temperature of the exhaust catalyst is at or above a first threshold temperature (T1). The temperature of the exhaust catalyst may be inferred based on output of a catalyst temperature sensor and/or an exhaust temperature sensor. T1 may be a pre-calibrated temperature corresponding to a catalyst temperature at or above which the breakthrough HCs may have detrimental effects (such as coking) on the engine system. T1 may be higher than the light-off temperature of the catalyst.

If it is determined that conditions are not met for HC breakthrough mitigation, such as the breakthrough occurring during engine operation when the airflow may cause the HC to flow into the bleed canister with any remaining portion diffusing to atmosphere, at 306, current engine condition may be maintained. Maintaining current engine condition may include continuing combustion of air and fuel in the engine cylinders.

If it is determined that conditions are met for HC breakthrough mitigation, at 309, a cooling system for the turbocharger may be activated. As an example, a cooling system (such as cooling system 220 in FIG. 2) of the turbine may be activated to reduce the temperature of the mechanical components of the turbine. The coolant pump of the cooling system may be operated to circulate coolant through the turbine. Also, a cooling fan coupled to the turbine may be operated to cool the exhaust system.

In order to cool the exhaust system, and particularly the emissions control device (catalyst), at 310, air flow to the exhaust catalyst may be initiated. Since the engine is stationary, air flow through the catalyst may have been suspended and upon resuming flow of fresh air through the catalyst in absence of hot exhaust, the catalyst may be cooled. Air flow through the catalyst may be initiated by, at 312, operating the engine un-fueled. The engine may be spun unfueled via an-board motor such as a starter motor or a vehicle propulsion motor (such as motor 120 in FIG. 1). The speed of rotation of the engine may be adjusted based on the temperature of the exhaust catalyst, the speed of rotation decreased with a decrease in the temperature of the exhaust catalyst. As the engine is rotated un-fueled, fresh, cold air flows in through each of the intake manifold, the throttle, intake valves, the engine cylinders, the exhaust valves, and the exhaust passage, and then reaches the catalyst. During operation of the engine, unfueled, the EGR valve (such as EGR valve 282 in FIG. 2) may be actuated to closed position. Since the temperature of the fresh air is considerably lower than that of the catalyst, heat from the catalyst is extracted by the air as it flows out of the exhaust passage, thereby cooling the catalyst.

Air flow through the catalyst may also be initiated by, at 314, operating the e-booster and routing the compressed cold air from the intake passage to the exhaust passage via an EGR passage (such as HP-EGR passage 280 in FIG. 2) and a wastegate passage (such as wastegate passage 274 in FIG. 2). The controller may send a signal to the actuator of the e-booster to activate the booster. Also, the e-booster bypass valve (such as bypass valve 262 in FIG. 2) may be actuated to a closed position to divert the entire volume of intake air through the e-booster. The EGR valve may be actuated to an open position to establish fluidic communication between the intake passages, from downstream of the e-booster, to the exhaust passage, upstream of the turbine. The wastegate valve (such as wastegate valve 275 in FIG. 2) may be actuated to an open position to allow air flowing into the exhaust passage to bypass the turbine and directly flow to the catalyst. The speed of rotation of the e-booster may be adjusted based on a state of charge (SOC) of the battery powering the-booster and the temperature of the exhaust catalyst, the speed of rotation decreased with a decrease in each of the SOC and the temperature of the exhaust catalyst. During operation of the e-booster, the compressed fresh air may flow from the e-booster to catalyst via each of the HP-EGR passage and the wastegate passage. By bypassing the turbine, the fresh, compressed air is not heated by extraction of heat from the turbine components. Heat from the catalyst may be extracted by the compressed air as it flows out of the tailpipe, thereby cooling the catalyst.

In one example, the operation of the e-booster and the rotation of the engine (un-fueled) may be carried out simultaneously to attain expedited catalyst cooling. In another example, either the engine may be rotated, un-fueled, or the e-booster may be operated to attain catalyst cooling. In one example, the e-booster may be operated if the SOC of the battery powering the-booster is higher than a first threshold charge enabling the use of the e-booster. In another example, the engine may be rotated, un-fueled if the state of charge of the battery powering the-booster is lower than the threshold charge. The threshold charge may be pre-calibrated based on the duration of e-booster operation desired for effective cooling of the catalyst.

Further, the amount of air flow to the exhaust catalyst may be adjusted over the duration of the cooling period based on the SOC of the battery powering the-booster and a desired rate of cooling of the exhaust catalyst. In one example, if the SOC decreases to below a second threshold charge, the second threshold charge higher than the first threshold charge, in order to conserve charge, the speed of operation of the e-booster may be reduced, thereby reducing the amount of air flow to the exhaust catalyst. In another example, if the rate of cooling of the exhaust catalyst is higher than a desired rate, the catalyst temperature may undesirably decrease below the light-off temperature even after the air flow is suspended (during an engine off condition). Also, any other emissions control device positioned downstream of the catalyst may be undesirably cooled due to the air flow. Therefore, in response to the rate of cooling of the exhaust catalyst being higher than a desired rate or undesired cooling of another emissions control device, the amount of air flow to the exhaust catalyst may be reduced by one or more of reducing the speed of operation of the e-booster, reducing a speed of rotation of the engine, reducing an opening of the EGR valve (when e-booster is used for supplying the air flow), and reducing an opening of the wastegate valve.

At 316, the routine includes determining if the temperature of the catalyst has reduced from the first threshold temperature (T1) and is above a second threshold temperature (T2). T2 may be the light-off temperature of the catalyst, and it is desired to maintain the catalyst temperature above the light-off temperature to ensure effective treatment of exhaust gas upon engine restart. In one example, T1 may be in the range of 700-750° F. and T2 may be in the range of 400-600° F. Once the catalyst temperature is between T1 and T2, further cooling of the catalyst is no longer desired as further cooling may reduce the temperature of the catalyst to below the light-off temperature which may in turn cause cold-start emissions during the upcoming engine start.

If it is determined that the catalyst temperature has not decreased below T1, it may be inferred that further cooling of the catalyst is desired. At 318, flow of fresh air to the catalyst may be continued by rotating the engine unfueled and/or operating the e-booster. If it is determined that the catalyst temperature is below T1 and above T2, flow of fresh air to the catalyst may be suspended. The controller may send a signal to the actuator of the motor rotating the engine to stop engine rotation. The controller may also send a signal to the actuator of the e-booster to deactivate the e-booster. At 322, upon an immediately subsequent engine start following the idle-stop, such as in response to an increased torque demand, the fuel vapor canister may be purged. By purging the canister, possibility of further HC breakthrough may be reduced.

In this way, in response to a hydrocarbon breakthrough during an engine-off condition, an engine may be operated un-fueled and/or an electric booster (e-booster) may be operated to route ambient air to an exhaust passage to cool an exhaust catalyst to actively cool the catalyst.

FIG. 4 shows an example operating sequence 400 for mitigating breakthrough of HCs from a fuel vapor canister of an EVAP system (such as emissions EVAP system 251 in FIG. 2) in a vehicle. The horizontal (x-axis) denotes time and the vertical markers t1-t6 identify significant times in the HC breakthrough mitigation.

The first plot, line 402, denotes engine speed during vehicle operation. The second plot, line 404, denotes a temperature of an exhaust catalyst (such as emissions control device 270 in FIG. 2) as estimated via an exhaust temperature sensor (such as temperature sensor 237 in FIG. 2). First dashed line 405 denotes a first threshold temperature above which cooling of the catalyst is desired during a HC breakthrough. Second dashed line 406 denotes a light-off temperature of the catalyst. The third plot, line 408, denotes a HC breakthrough from the fuel vapor catalyst as estimated based on an output of a HC sensor (such as HC sensor 246 in FIG. 2) coupled to the vent line of the EVAP system downstream of the canister. The fourth plot, line 410, denotes a state of charge (SOC) of a battery powering operation of an e-booster (such as e-booster 255 in FIG. 2) coupled to the intake passage. Dashed line 411 denotes a first threshold SOC below which the e-booster cannot be operated to provide the desired flow of compressed ambient air. Dashed line 412 denotes a second threshold SOC below which a speed of operation of the e-booster is adjusted to conserve charge of the battery. The fifth plot, line 414, the speed of operation of the e-booster. The amount of air compressed at the e-booster is directly proportional to the speed of the e-booster. The sixth plot, line 416, denotes a state of opening of an EGR valve (such as EGR valve 282 in FIG. 2) regulating fluid flow through the EGR passage connecting the intake passage (downstream of the e-booster) to the exhaust passage (upstream of an exhaust turbine). The seventh plot, line 418, denotes a state of opening of a wastegate valve (such as wastegate valve 275 in FIG. 2) regulating flow of fluids across the exhaust turbine, bypassing the turbine.

Prior to time t1, the engine is operated by combusting air and fuel in the engine cylinders. The catalyst temperature is above each of the first threshold temperature and the light-off temperature of the catalyst and no HC breakthrough is detected. The EGR valve is maintained in a closed position due to no demand for EGR. Also, the wastegate valve is maintained in a closed position to allow the entire volume of exhaust to flow through the turbine (and not bypass the turbine). The SOC of the battery powering operation of the e-booster is above the each of the first threshold SOC and the second threshold SOC.

At time t1, in response to conditions being met for an engine idle-stop, the engine is stopped and combustion is suspended. Between time t1 and t2, the catalyst temperature remains above the each of the first threshold temperature and the second threshold temperature and no HC breakthrough is detected. However, at time t2, a HC breakthrough from the fuel vapor canister is detected by the HC sensor.

In response to the detected HC breakthrough, at t3, the electric booster is activated. The speed of operation of the e-booster is determined as a function of the SOC and the temperature of the catalyst. Also, each of the EGR valve and the wastegate valve is actuated to their respective completely open positions. Intake air is compressed at the e-booster and routed to the catalyst via the EGR passage and the wastegate passage, bypassing the engine cylinders and the exhaust turbine. As fresh, compressed air flows through the catalyst, between time t3 and t4, the temperature of the catalyst decreases. During operation of the e-booster, the SOC of the battery powering operation of the e-booster decreases.

At time t4, in response to the SOC of the battery decreasing to below the second threshold SOC 412, a mode for conservation of charge for the battery is initiated. In order to conserve the charge, the speed of operation of the e-booster is reduced. Even at the reduced e-booster speed, compressed air flows through the catalyst, between time t4 and t5, decreasing the temperature of the catalyst.

At time t5, it is inferred that the temperature of the catalyst has decreased to be low the first threshold temperature but is still above the light-off temperature of the catalyst, flow of fresh air to the catalyst is suspended by deactivating the e-booster. Also, each of the EGR valve and the wastegate valve is actuated to their respective closed positions. Between time t5 and t6, the catalyst temperature remains between the first and second temperature thresholds and the engine is idle-stopped. At time t6, in response to an increase in torque demand, the engine is restarted. Due to the timely stopping of catalyst cooling (at time t5), the catalyst temperature remains above its light-off temperature at engine restart, thereby maintaining emissions quality.

In this way, by routing fresh air to the exhaust catalyst during a HC breakthrough, the exhaust system may be actively cooled, and the possibility of coking and mechanical wear of the exhaust system may be reduced. By operating the engine unfueled and/or the e-booster, fresh air may be delivered to the catalyst without initiating combustion in the engine, thereby improving fuel economy. Overall, by effectively mitigating the adverse effects of a HC breakthrough, desired emissions quality and robustness of the exhaust system may be maintained.

An example method for an engine in a vehicle comprises: during an engine-off condition, actively reducing a temperature of an exhaust catalyst by routing ambient air to the exhaust system. In any the preceding examples, additionally or optionally, the routing of air to the exhaust system is in response to a breakthrough of hydrocarbons (HCs) from a fuel vapor canister of an on-board evaporative emissions control (EVAP) system. In any or all of the preceding examples, additionally or optionally, the routing of air to the exhaust system is further in response to a temperature of the exhaust catalyst being higher than a first threshold temperature, the first threshold temperature higher than a light-off temperature of the exhaust catalyst. In any or all of the preceding examples, additionally or optionally, the routing of ambient air to the exhaust system is continued until the temperature of the exhaust catalyst reduces to below the first threshold temperature, the temperature of the exhaust catalyst staying above the light-off temperature. In any or all of the preceding examples, additionally or optionally, the routing ambient air is by rotating the engine un-fueled via an electric motor. In any or all of the preceding examples, additionally or optionally, the routing ambient air is by operating an electric booster (e-booster) coupled to an intake passage of the engine. Any or all of the preceding examples, the method further comprising, additionally or optionally, during rotation of the engine, opening a wastegate valve housed in a wastegate passage across an exhaust turbine to route ambient air from engine cylinders to the exhaust catalyst bypassing the exhaust turbine. Any or all of the preceding examples, the method further comprising, additionally or optionally, during operation of the e-booster, opening each of an exhaust gas recirculation (EGR) valve coupled to a high pressure EGR line and the wastegate valve to route ambient air from the e-booster to the exhaust catalyst bypassing the engine cylinders and the exhaust turbine. Any or all of the preceding examples, the method further comprising, additionally or optionally, during the routing the ambient air to the exhaust system, operating a coolant pump and/or a cooling fan of a cooling system coupled to the exhaust turbine to cool the exhaust system. In any or all of the preceding examples, additionally or optionally, the engine-off condition is during an engine idle-stop when the vehicle is at rest. In any or all of the preceding examples, additionally or optionally, the breakthrough of the HCs is detected via a HC sensor coupled to a vent line of the EVAP system downstream of the fuel vapor canister.

Another example method for an engine in a vehicle, comprises: in response to a hydrocarbon breakthrough during an engine-off condition, operating an engine un-fueled and/or operating an electric booster (e-booster) to route ambient air to an exhaust passage to cool an exhaust catalyst. In the preceding example, additionally or optionally, the hydrocarbon breakthrough is from a fuel vapor canister of an on-board evaporative emissions control (EVAP) system during an engine idle-stop condition. In any or all of the preceding examples, additionally or optionally, additionally or optionally, during operation of the e-booster, opening each of an exhaust gas recirculation (EGR) valve coupled to a high pressure EGR line and a wastegate valve housed in a wastegate passage across an exhaust turbine, the higher pressure EGR line coupled to an intake passage downstream of the e-booster at a first end, and to the exhaust passage upstream of the exhaust turbine at a second end. In any or all of the preceding examples, additionally or optionally, the routing air to the exhaust catalyst includes routing compressed, ambient air from the e-booster to the exhaust catalyst via each of the high pressure EGR line and the wastegate passage bypassing engine cylinders and the exhaust turbine. In any or all of the preceding examples, additionally or optionally, additionally or optionally, during operation of the engine un-fueled, opening the wastegate valve and closing the EGR valve to route ambient air from the engine cylinders to the exhaust catalyst via the wastegate passage bypassing the exhaust turbine. In any or all of the preceding examples, additionally or optionally, the routing ambient air to the exhaust passage is continued until a temperature of the exhaust catalyst decreases to below a threshold temperature.

Yet another example for an engine in a vehicle, comprises: a controller storing instructions in non-transitory memory that, when executed, cause the controller to: upon conditions being met for hydrocarbon breakthrough mitigation, operate an electric motor coupled to an intake manifold of the engine, open an exhaust gas recirculation (EGR) valve regulating flow through a high pressure EGR line, open a wastegate valve housed in a wastegate passage across an exhaust turbine, and route compressed ambient air to an exhaust catalyst coupled to an exhaust passage via the high pressure EGR line and the wastegate passage. In the preceding example, additionally or optionally, the conditions for hydrocarbon breakthrough mitigation include detection of an hydrocarbon breakthrough from a fuel vapor canister of an on-board evaporative emissions control (EVAP) system during an engine idle-stop condition with a higher than threshold temperature of the exhaust catalyst. In any or all of the preceding examples, additionally or optionally, the controller includes further instructions to: purge the fuel vapor canister upon engine start following the idle-stop condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a vehicle, comprising:
during an engine-off condition, actively reducing a temperature of an exhaust catalyst by routing ambient air to an exhaust system;
wherein the routing of air to the exhaust system is in response to a breakthrough of hydrocarbons (HCs) from a fuel vapor canister of an on-board evaporative emissions control (EVAP) system.

2. The method of claim 1, wherein the routing of air to the exhaust system is further in response to the temperature of the exhaust catalyst being higher than a first threshold temperature, the first threshold temperature higher than a light-off temperature of the exhaust catalyst.

3. The method of claim 2, wherein the routing of the ambient air to the exhaust system is continued until the temperature of the exhaust catalyst reduces to below the first threshold temperature, the temperature of the exhaust catalyst staying above the light-off temperature.

4. The method of claim 1, wherein the routing ambient air is by rotating the engine un-fueled via an electric motor.

5. The method of claim 4, wherein the routing ambient air is by operating an electric booster (e-booster) coupled to an intake passage of the engine.

6. The method of claim 5, further comprising, during rotation of the engine, opening a wastegate valve housed in a wastegate passage across an exhaust turbine to route the ambient air from engine cylinders to the exhaust catalyst bypassing the exhaust turbine.

7. The method of claim 6, further comprising, during operation of the e-booster, opening each of an exhaust gas recirculation (EGR) valve coupled to a high pressure EGR line and the wastegate valve to route ambient air from the e-booster to the exhaust catalyst bypassing the engine cylinders and the exhaust turbine.

8. The method of claim 1, further comprising, during the routing the ambient air to the exhaust system, operating a coolant pump and/or a cooling fan of a cooling system coupled to the exhaust turbine to cool the exhaust system.

9. The method of claim 1, wherein the engine-off condition is during an engine idle-stop when the vehicle is at rest.

10. The method of claim 1, wherein the breakthrough of the HCs is detected via a HC sensor coupled to a vent line of the EVAP system downstream of the fuel vapor canister.

11. A method for an engine, comprising:
in response to a hydrocarbon breakthrough during an engine-off condition, operating an engine un-fueled and/or operating an electric booster (e-booster) to route ambient air to an exhaust passage to cool an exhaust catalyst.

12. The method of claim 11, wherein the hydrocarbon breakthrough is from a fuel vapor canister of an on-board evaporative emissions control (EVAP) system during an engine idle-stop condition.

13. The method of claim 11, further comprising, during operation of the e-booster, opening each of an exhaust gas recirculation (EGR) valve coupled to a high pressure EGR line and a wastegate valve housed in a wastegate passage across an exhaust turbine, the high pressure EGR line coupled to an intake passage downstream of the e-booster at a first end, and to the exhaust passage upstream of the exhaust turbine at a second end.

14. The method of claim 13, wherein the routing air to the exhaust catalyst includes routing compressed, ambient air from the e-booster to the exhaust catalyst via each of the high pressure EGR line and the wastegate passage bypassing engine cylinders and the exhaust turbine.

15. The method of claim 13, further comprising, during operation of the engine un-fueled, opening the wastegate valve and closing the EGR valve to route ambient air from the engine cylinders to the exhaust catalyst via the wastegate passage bypassing the exhaust turbine.

16. The method of claim 11, wherein the routing ambient air to the exhaust passage is continued until a temperature of the exhaust catalyst decreases to below a threshold temperature.

17. A system for an engine in a vehicle, comprising:
a controller storing instructions in non-transitory memory that, when executed, cause the controller to:
upon conditions being met for hydrocarbon breakthrough mitigation,
operate an electric motor coupled to an intake manifold of the engine;
open an exhaust gas recirculation (EGR) valve regulating flow through a high pressure EGR line;
open a wastegate valve housed in a wastegate passage across an exhaust turbine; and
route compressed ambient air to an exhaust catalyst coupled to an exhaust passage via the high pressure EGR line and the wastegate passage.

18. The system of claim 17, wherein the conditions for hydrocarbon breakthrough mitigation include detection of an hydrocarbon breakthrough from a fuel vapor canister of an on-board evaporative emissions control (EVAP) system during an engine idle-stop condition with a higher than threshold temperature of the exhaust catalyst.

19. The system of claim 18, wherein the controller includes further instructions to: purge the fuel vapor canister upon engine start following the idle-stop condition.

* * * * *